United States Patent Office 2,890,233
Patented June 9, 1959

2,890,233

IRON-CONTAINING ORGANIC COMPOUNDS

Adolf Christian Josef Opfermann, Bergisch-Gladbach, Germany

No Drawing. Application October 13, 1952
Serial No. 314,577

3 Claims. (Cl. 260—439)

The invention relates to the production of iron-containing organic compounds, especially of di-α,γ-dihydroxybutyro-ferric acid and its salts. These compounds are iron preparations suitable for injection for therapeutic purposes. It is known to react α-hydroxybutyrolactone by boiling with milk of lime to form the calcium salt of α,γ-dihydroxybutyric acid.

It is also known to prepare complex iron salts from the polycarboxylic acids of the pentane and hexane series by reacting them or their salts with iron or iron compounds and neutralising the complex acids obtained with basic substances.

Finally, a process has been published for the preparation of an iron compound which is obtained by the action of a ferric salt on a salt of α,γ-dihydroxy-β,β-dimethyl-butyric acid. The ferric salt mentioned is ferric sulphate, which is said to be reacted with a solution of barium α,γ-dihydroxy-β,β-dimethylbutyrate.

The iron compounds obtained by the last two processes mentioned do not appear to be very suitable for injections; especially the last mentioned complex iron compound exhibits secondary phenomena in the organism when it is employed.

It has now been found that the complex iron compounds which are produced in accordance with the invention and which are derived from hydroxy-butyrolactone, i.e., from compounds with four carbon atoms in the molecule, do not exhibit these secondary phenomena on being injected and can be well tolerated.

The process for the production of di-α,γ-dihydroxy-butyroferric acid and its salts is, according to the invention, carried out by precipitation of a solution of the alkaline-earth salt of α,γ-dihydroxybutyric acid, which solution is obtained in the known manner by reaction hydroxybutyrolactone with solutions of alkaline-earth hydroxides with application of heat, with a ferric salt of an acid, the alkaline-earth salt of which is insoluble in the solvent employed, and by evaporating in vacuo the solution which has been filtered off from the alkaline-earth salt.

Barium hydroxide is principally employed as the alkaline-earth hydroxide; however, magnesium, calcium and strontium hydroxide may be employed. The reaction of the hydroxybutyrolactone is carried out in a solvent which is suited to the ferric salt to be subsequently employed. If, for example, ferric sulphate or ferric phosphate is employed, it is possible to work in an aqueous solution. If the more soluble ferric nitrate is chosen, it is more appropriate to work in a mixture of methyl alcohol or ethyl alcohol with water as the solvent. This reaction can be accelerated by heating. Advantageously, the heating is carried out to boiling beneath a reflux condenser.

From the barium salt of α,γ-dihydroxybutyric acid obtained, the barium is precipitated as barium sulphate by means of, for example, ferric sulphate. The precipitation must be carried out so completely that the solution contains neither barium ions nor sulphate ions.

The precipitate of barium sulphate is separated by filtration or suction and the solution obtained, which has a deep brown colour, is evaporated in vacuo. The di-α,γ-dihydroxybutyroferric acid is obtained as a slightly brown crystalline powder.

If importance is attached to obtaining a specially pure product, the acid may be dissolved in methanol and precipitated with acetone. The precipitate is generally paler than the dissolved acid.

In order to produce salts, the aqueous solution of the acid is reacted with the hydroxides, the bicarbonates or the carbonates of the desired metals.

Example 102 grams of hydroxybutyrolactone are heated with 2.12 litres of baryta solution, which contains an equivalent weight of barium hydroxide, for 6 hours under a reflux condenser. The solution obtained is mixed with 920 ccs. of a solution of ferric sulphate which contains 27.62 grams of iron. The precipitate formed is filtered off from the barium sulphate. The solution that remains, which has a deep brown colour, has a pH value of 3 to 4. Any sulphate ions which are still present are precipitated with measured quantities of baryta solution, so that the solution which remains after separating the barium sulphate does not give any reaction with barium chloride or with sulphuric acid. Its pH value is now 4.

The solution is evaporated in vacuo. The slightly brown crystalline cake is dissolved with double the quantity of methanol and the di-α,γ-dihydroxybutyro-ferric acid is precipitated therefrom with acetone. The precipitate formed is filtered with suction and dried. A yellowish-brown powder is obtained.

Di-α,γ-dihydroxybutyro-ferric acid has the following formula:

$$H\left[Fe\left(\begin{array}{c}-OCO\\-OCH-CH_2-CH_2OH\end{array}\right)_2\right] = H\left[\begin{array}{ccccc}CH_2&-CHO&&OHC-CH_2\\|&|&\diagdown&\diagup&|&|\\CH_2OH&COO&-Fe-&OOC&CH_2OH\end{array}\right]$$

*Analysis.*—Found: 31.40% C; 4.60% H. Calculated: 32.80% C, 4.11% H.

By neutralising with sodium bicarbonate in aqueous solution, the free acid hydrogen atom of the compound is replaced by sodium. The solution of the sodium salt obtained is of a brown colour and is quite stable. It has a pH value of 7. By evaporating the solution in vacuo, the sodium salt of di-α,γ-dihydroxybutyro-ferric acid is obtained in the solid form.

What I claim is:

1. A compound selected from the group consisting of di-α,γ-dihydroxybutyrato-ferric acid and an alkali metal salt thereof.

2. Di-α,γ-dihydroxybutyrato-ferric acid.

3. The sodium salt of di-α,γ-dihydroxybutyratoferric acid.

References Cited in the file of this patent

UNITED STATES PATENTS

| | | |
|---|---|---|
| 2,097,235 | Schmidt et al. | Oct. 26, 1937 |
| 2,215,429 | Schmidt et al. | Sept. 17, 1940 |
| 2,474,989 | Schnider | July 5, 1949 |